Patented Sept. 25, 1951

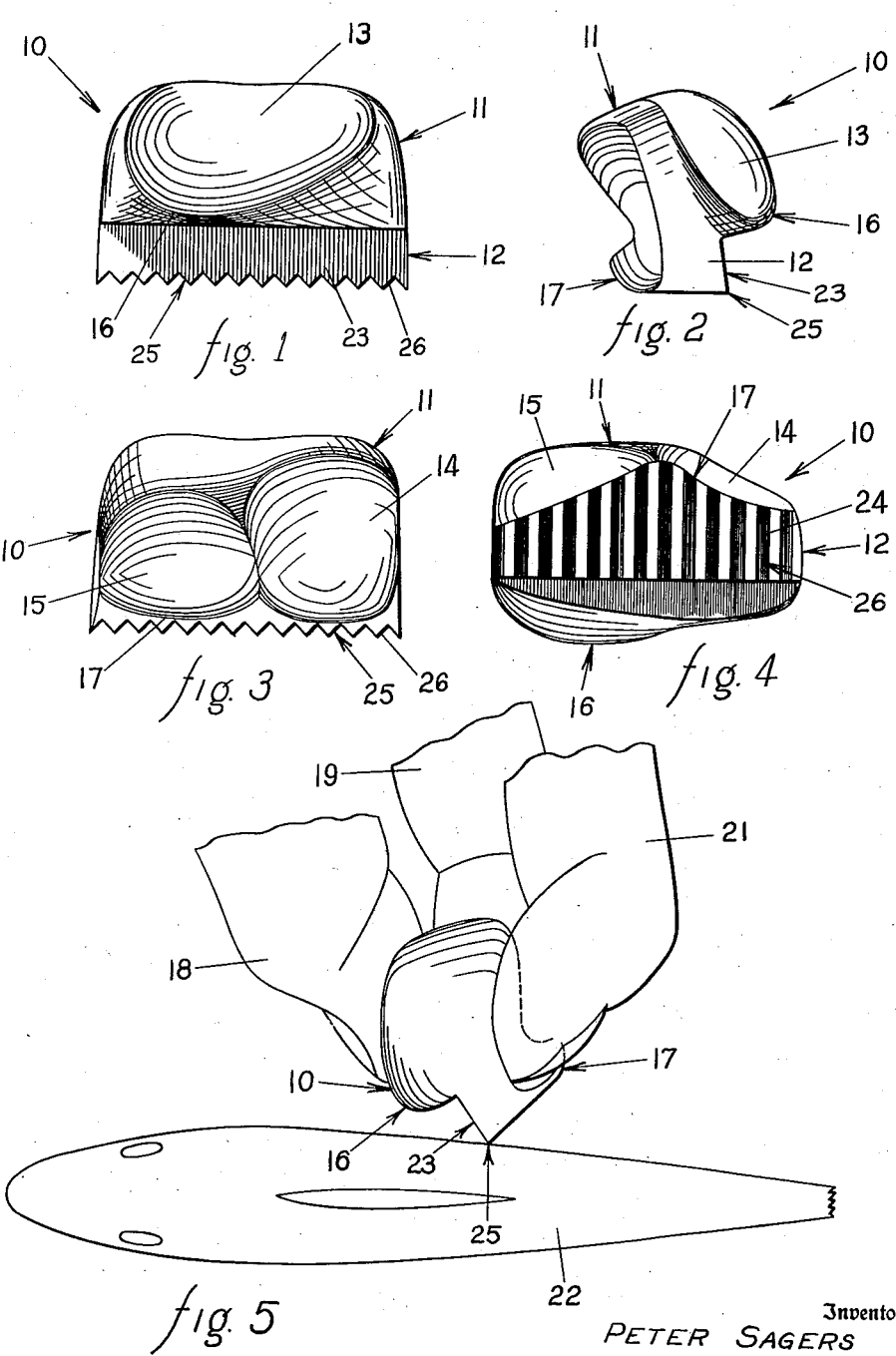

2,569,022

UNITED STATES PATENT OFFICE 2,569,022

FISH SCALER

Peter Sagers, Kalamazoo, Mich.

Application April 21, 1949, Serial No. 88,843

3 Claims. (Cl. 17—7)

This invention relates in general to a fish scaler and more particularly to a type thereof which can be firmly gripped between the thumb and fingers and which is designed to positively control the movement of fish scales during a scaling operation.

Fishermen, as well as other persons acquainted with the problems of cleaning fish, have long recognized the desirability for a fish scaling device designed to prevent fish scales from flying during the scaling operation. The need for such a device has become particularly apparent where the fish must be cleaned indoors. It is easily observed that flying fish scales result from the fact that all fish scaling devices presently known to exist either provide no means for controlling the action of the fish scales after they are removed from the fish, or are so flexible that they actually impart speed to the movement of the scales as they are removed from the fish. In addition to the above mentioned undesirable features, presently known types of fish scaling devices provide no means for preventing the fish scales from getting on the hand holding the scaling device and, due to their structure, often cause considerable discomfort to the hand holding the scaling device.

Accordingly, a primary object of my invention is the provision of a fish scaling device whereby the action of the fish scales, as they are removed from a fish, is positively controlled and said scales are prevented from flying in all directions.

A further object of my invention is the provision of a fish scaling device, as aforesaid, having a scaling edge which is so close to the hand operating the device that there is no chance for flexion between the scaling edge and the scaling device, which flexion normally contributes substantially to the flying of the fish scales.

A further object of my invention is the provision of a fish scaling device, as aforesaid, having means for preventing the fish scales from coming in contact with the hand holding the scaling device.

A further object of my invention is the provision of a fish scaler, as aforesaid, which is extremely small and compact in size, which has a scaling edge sufficiently dull that the device can be easily carried in a pocket without causing damage thereto, which can be easily fabricated in a single piece, and which can be used sufficiently by persons unskilled in scaling fish.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a fish scaler comprising a gripping portion having recesses contoured for and engageable by the tips of the thumb and fingers of a single hand. A blade portion, which is preferably integral with said gripping portion, extends therefrom along the side thereof adjacent to the portions of said recesses engageable by the tips of said thumb and fingers. The blade portion is provided with a scaling edge substantially parallel to a plane defined by those edges of said recesses adjacent to said blade portion. Thus, when the fish scaler is held in operating position said scaling edge is directly below the tips of said thumb and fingers.

For the purpose of convenience in description, the terms "upper" or "above" and "lower" or "below," as used in this specification, shall be understood to have reference to the device, or the parts thereof, when positioned or operating in their normal manner of use.

For illustrations of a preferred embodiment of my invention, reference is made to the accompanying drawings in which:

Figure 1 is a front elevation view of my fish scaler showing a thumb recess therein.

Figure 2 is an end elevation view of the leftward end of said fish scaler as appearing in Figure 1 and showing the thumb and first finger recesses.

Figure 3 is a rear elevation view of my fish scaler showing first and second finger recesses.

Figure 4 is a bottom plan view of my fish scaler.

Figure 5 is an end elevation view of my fish scaler, from the rightward end thereof as appearing in Figure 1, and the thumb and fingers of a hand holding my scaler in operating position with respect to a fish.

The fish scaler 10 (Figures 1, 2 and 3), to which this invention relates, is preferably fabricated, as by casting, from any appropriate material such as aluminum or a plastic. The fish scaler 10 is comprised of a gripping portion 11 and a blade portion 12 which blade portion is preferably, but not necessarily, integral with said gripping portion.

The gripping portion 11 (Figures 1, 2 and 3) has a thumb recess 13 on one side thereof and first and second finger recesses 14 and 15, respectively, on the other side thereof. The said recesses 13, 14 and 15 are advantageously contoured for engagement by the ends of the thumb and first and second fingers, respectively, of a single hand. The lower end of the gripping portion 11 extends outwardly below the thumb and finger recesses to provide the thumb shelf 16 and the finger shelf 17. The upper surfaces of the thumb and finger shelves 16 and 17, respectively, constitute the lower portions of the thumb and finger recesses 13, 14 and 15. These said upper surfaces are engaged by the tips of the thumb 18 and the first and second fingers 19 and 21 (Figure 5) as the scaler 10 is urged downwardly against the fish 22, during the scaling operation.

The blade portion 12 (Figure 2) which, as aforesaid, is preferably integral with the gripping portion 11, extends downwardly below the gripping portion 11 and has a substantially wedge shaped cross-section. The blade portion 12 is provided with a flat scaling surface 23 and a substantially flat, serrated bottom surface 24 which surfaces intersect along the scaling edge 25, said scaling edge being remote from the gripping portion 11. The serrations 26 in the serrated surface 24 extend into the scaling edge 25 thereby also causing said scaling edge 25 to be serrated, as shown in Figures 1 and 3.

The scaling edge 25 is preferably, but not necessarily, substantially parallel with a plane defined by those edges of the thumb and finger recesses 13, 14 and 15, respectively, adjacent to the blade portion 12. Said scaling edge is, therefore, preferably spaced from and directly below the gripping portion 11.

The scaling surface 23, which extends between the scaling edge 25 and the thumb shelf 16, defines a plane which substantially bisects the thumb recess 13. The serrated surface 24 extends from the scaling edge 25 and blends into the lower edge of the finger shelf 17. The scaling surface 23 is preferably disposed at an angle of from about 75 to 85 degrees to the serrated surface 24.

As shown in Figure 5, the scaling surface 23 is preferably disposed at an angle of less than 90 degrees to the surface of the fish 22 during the scaling operation. The thumb and finger recesses 13, 14 and 15, respectively, are preferably so disposed in the gripping portion 11 as to facilitate the angular disposition, mentioned above between the scaling surface 23 and the fish 22, when the fish scaler 10 is manually held in a normal, comfortable position above the fish being scaled whereby direct downward pressure can be applied to the fish scaler.

It will be seen in Figure 5 that the thumb shelf 16 extends outwardly from the scaling surface 23 so as to shield the thumb 18 from the scales being removed from the fish 22. The thumb shelf 16 also deflects fish scales being removed from the fish 22 downwardly toward the fish, thereby controlling their action and preventing their dispersal. Inasmuch as the fish scaler 10 is drawn across the surface of the fish 22, the wiping or flexing action normally created by conventional fish scalers is completely eliminated.

It will be recognized that although the scaling edge 25 is herein shown and described as having a serrated edge, the serrations 26 may be omitted therefrom without departing from the scope of this invention. Furthermore, although the above mentioned drawing and description apply to one particular, preferred embodiment of my invention, it is not my intention, implied or otherwise, to eliminate other variations or modifications which do not depart from the scope of this invention unless specifically stated to the contrary in the hereinafter appended claims.

I claim:

1. In a one-piece, compact fish scaler, the combination comprising: a gripping portion having a thumb tip recess on one side thereof and two finger tip recesses on the opposite side thereof; a blade portion integral with said gripping portion and having a flat, narrow scaling surface with a rigid, serrated scaling edge remote from said gripping portion, said scaling surface defining a plane substantially bisecting said thumb recess longitudinally; and a shelf integral with said gripping portion and extending therefrom substantially perpendicularly to said scaling surface between said thumb recess and said scaling surface for deflecting scales away from said gripping portion.

2. In a one piece, compact fish scaler, the combination comprising: a scaling portion having a planar face surface with a plurality of parallel serrations therealong and having a narrow, flat scaling surface substantially perpendicular both to said face surface and to the lengthwise extent of said serrations, said scaling surface intersecting said face surface to provide a rigid, serrated scaling edge; and a gripping portion extending rigidly from that side of said scaling portion remote from the scaling edge and extending outwardly of said scaling surface to provide a shelf substantially perpendicular thereto, said gripping portion having a thumb tip recess adjacent to said shelf and spaced therefrom to provide a wall therebetween and a pair of finger tip recesses on the opposite side of said gripping portion adjacent to said face surface and spaced therefrom to provide a wall between said face surface and said finger recesses.

3. In a one piece, compact fish scaler, the combination comprising: a planar face surface having a plurality of parallel serrations therein; a flat, narrow scaling surface substantially perpendicular both to said face surface and to the lengthwise extent of the serrations, said scaling surface intersecting said face surace to provide a rigid, serrated scaling edge; a shelf substantially perpendicular to said scaling surface and intersecting same along that edge thereof remote from said scaling edge, said shelf and face surface extending in opposite directions from said scaling surface; a thumb tip recess adjacent to said shelf and spaced therefrom to provide a wall therebetween; and a pair of finger tip recesses on the opposite side of said scaler from said thumb recess, adjacent to said face surface and spaced thererom to provide a wall between said face surface and said finger recesses.

PETER SAGERS.

REFERENCES CITED

The following references are of record in the file of this patent:

UNITED STATES PATENTS

| Number | Name | Date |
|---|---|---|
| 1,028,736 | Kell | June 4, 1912 |
| 1,997,339 | Olson | Apr. 9, 1935 |
| 2,338,647 | Koon | Jan. 4, 1944 |

FOREIGN PATENTS

| Number | Country | Date |
|---|---|---|
| 18,912 | Great Britain | 1889 |
| 344,534 | Germany | Nov. 24, 1921 |